No. 694,375. Patented Mar. 4, 1902.
D. T. GRANBERY.
HORSE HITCHING DEVICE.
(Application filed July 29, 1901.)
(No Model.)
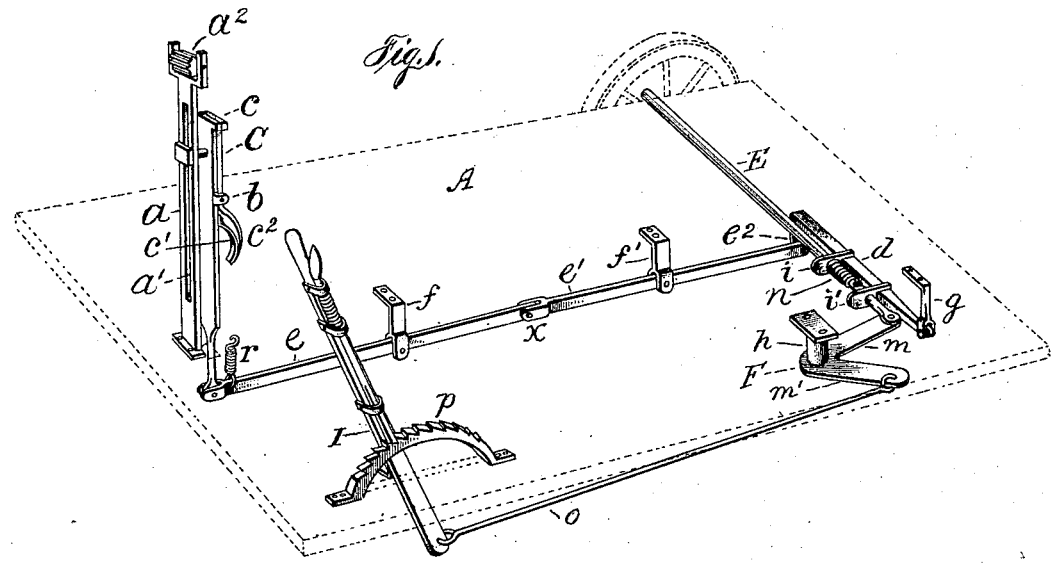
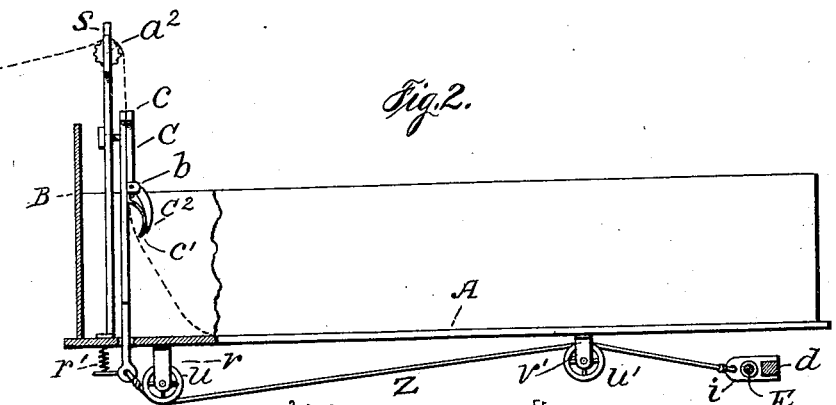

UNITED STATES PATENT OFFICE.

DEE TIE GRANBERY, OF MEMPHIS, TENNESSEE.

HORSE-HITCHING DEVICE.

SPECIFICATION forming part of Letters Patent No. 694,375, dated March 4, 1902.

Application filed July 29, 1901. Serial No. 70,147. (No model.)

*To all whom it may concern:*

Be it known that I, DEE TIE GRANBERY, a citizen of the United States, residing at Memphis, in the county of Shelby and State of Tennessee, have invented new and useful Improvements in Hitching Devices for Horses, of which the following is a specification.

This invention relates to safety attachments for vehicles, and consists in certain improvements in devices for hitching horses securely and preventing their running away.

In the accompanying drawings, Figure 1 is a perspective view illustrating my invention, certain parts being indicated in broken lines. Fig. 2 is a sectional side view showing a modification in the construction of certain parts. Fig. 3 is a front view of a slotted standard employed. Fig. 4 is a side view of a clamp employed in connection with the slotted standard.

A designates the wagon-bed, the same being indicated in broken lines in Fig. 1. To the forward part of the bed is secured a dashboard B, adjacent to which is a standard $a$, which has a slot $a'$ and carries a serrated roller $a^2$, hereinafter referred to.

C indicates a clamp having jaws $c$, which are pivotally connected at $b$. The jaws $c$ are kept closed by a spring $c'$, acting against a curved handle $c^2$, and may be opened by pressing said handle. One of said jaws extends downward in the form of a rod through the bed of the vehicle and has a loose connection at its lower end with a rod $e$, which extends rearward under the bed A and has a loose joint at $x$ with a rod $e'$, which extends farther rearward. The rods $e$ and $e'$ are respectively sustained in position by the hangers $f$ and $f'$, the upper ends of which are secured to the bed A, the said rods being pivotally connected with said hangers, as shown. The rod $e'$ has at its rear end a loose connection with a lug $e^3$ of a horizontal bar $d$, the outward end of which is loosely connected with a hanger $g$, which is secured to the lower side of the bed A. To the bar $d$ are rigidly secured two perforated lugs $i$ and $i'$, in which is mounted a horizontal rod E, extending crosswise of and under the bed, said rod being in position to be projected between spokes of a wheel of the vehicle.

F indicates a bell-crank lever which is pivotally connected with a hanger $h$, secured to the under side of the bed. With an arm $m$ of the lever F is loosely connected one end of the rod E, the other arm $m'$ being connected by a rod $o$ with the lower end of a pivoted hand-lever I, which extends down through a slot in the bed and is adapted to connect with a rack $p$, mounted on the bed. When the lever I is moved forward, as seen in Fig. 1, the rod E is projected so as to connect with a wheel of the vehicle by the action of the bell-crank lever F, and when the lever I is raised from the rack $p$ the rod E is withdrawn from the wheel by the expansion of a spring $n$ on said rod between the lugs $i$ and $i'$.

To adjust the device for hitching a horse or team, the reins are placed between the guides $s$ on the standard $a$, the reins resting on the roller $a^2$, and being drawn equally the reins are secured between the clamping-jaws $c$, which are kept closed by the spring $c'$. The lever I is then thrown forward, which movement by the action of the bell-crank lever F projects the rod E so that it extends between spokes of a wheel of the vehicle and locks said wheel.

The hitching devices being properly adjusted, should the horse start to run away the rod E is caught by a spoke of the wheel as it turns, and said rod is pressed downward, and thus the rear end of the rod $e'$ is also pressed downward, which causes the joint $x$ of the two rods $e$ and $e'$ to rise against the bed A, and thus to draw downward the clamp C and the reins, thus checking the horse.

Should the horse while hitched undertake to move backward, the rod E is raised up against the wagon-bed and locks the wheel.

To unhitch the horse, reverse the position of the lever I and release the reins from the clamp by pressing the handle $c^2$.

In Fig. 2 is shown a modification in the construction of the device, the rods $e$ and $e'$ being dispensed with, and two pulleys $u$ and $u'$, mounted in hangers $v$ and $v'$, carried by the wagon-bed, are employed with a cord $z$, one of which is attached to the rod of the clamp C, the cord being passed under the pulley $u'$ and connected with a lug, through which the rod E is passed. With this construction when the rod E is pressed downward by the wheel of the vehicle the cord $z$ is drawn and also the clamp-rod, thus drawing the reins and checking the horse.

The clamp C is loosely connected with the standard $a$ by a bolt extending through the slot $a'$ in the standard and a nut $n'$, which allows the clamp a vertical movement. The spring $r$ (shown in Fig. 1) serves to bring the clamp to its normal position after being pulled downward, and the spring $r'$ (shown in Fig. 2) is for a similar purpose.

The device can be constructed to be applied to any style of vehicle.

What I claim, and desire to secure by Letters Patent, is—

1. In a safety attachment for vehicles, the combination with the body of a vehicle, of a pivoted hand-lever and rack, a bell-crank lever, one arm of which is connected by a rod with said hand-lever, a horizontal rod connected with another arm of said bell-crank lever and adapted to be projected so as to connect with spokes of a wheel of the vehicle, and a retracting-spring for withdrawing said horizontal rod, substantially as and for the purposes described.

2. The combination with a vehicle-body, of a slotted standard, a spring-clamp loosely connected with said standard and having a rod extending downward through the body of the vehicle, horizontal rods having a loose joint $x$ and being loosely connected with hangers secured to said bed and with the rod of said clamp, a bar or rod, $d$, having at one end a loose connection with said horizontal rods, its opposite end being loosely connected with a hanger $g$, a horizontal rod movably connected with the rod $d$ and adapted to be projected so as to connect with a wheel of the vehicle, substantially as set forth and described.

3. The combination with a vehicle-body of a slotted standard having a roller mounted between guides at the top of the standard, a spring-clamp movably connected with said standard and extending downward through the bed of the vehicle, a spring adapted to keep said clamp in its normal position and mechanism constructed to automatically draw downward said clamp and the reins secured therein, substantially as set forth and described.

In testimony whereof I affix my signature in presence of two witnesses.

DEE TIE GRANBERY.

Witnesses:
G. W. MOORE,
S. L. MOORE.